United States Patent Office.

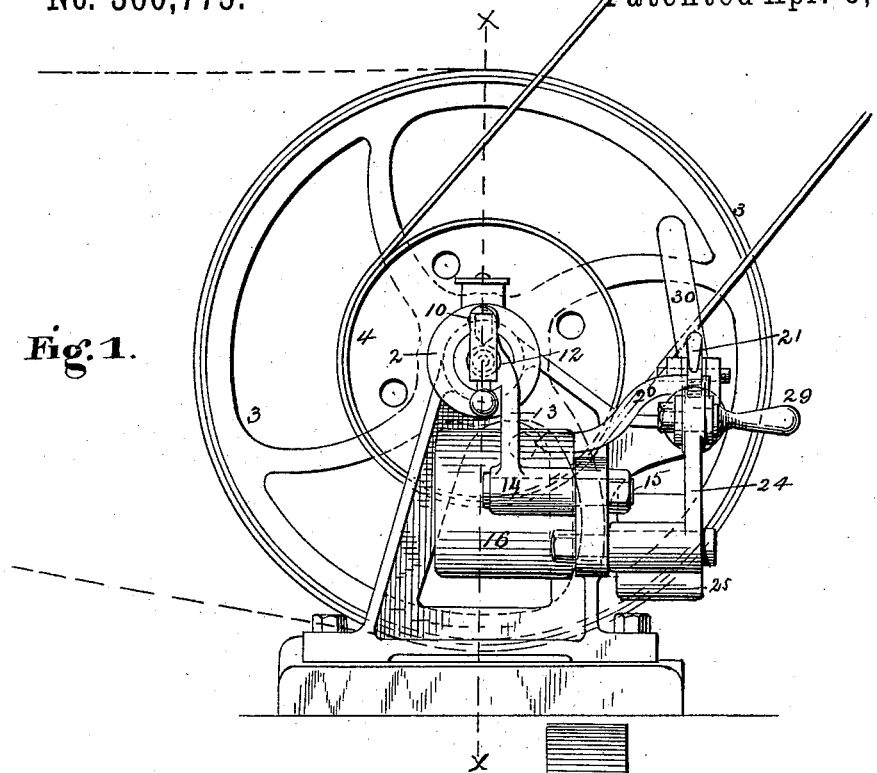

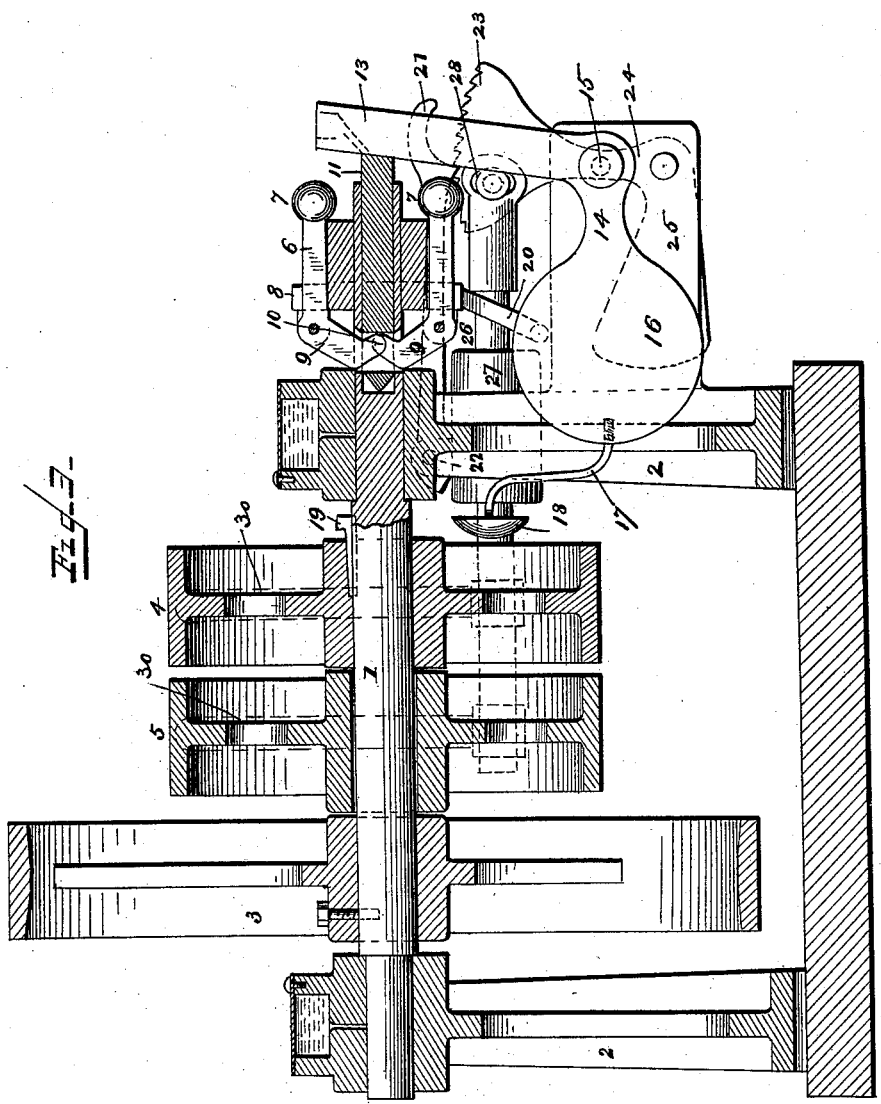

SVEN JÖNSSON, OF COPENHAGEN, DENMARK.

AUTOMATIC BELT-SHIFTING DEVICE.

SPECIFICATION forming part of Letters Patent No. 360,775, dated April 5, 1887.

Application filed November 27, 1886. Serial No. 220,035. (No model.)

*To all whom it may concern:*

Be it known that I, SVEN JÖNSSON, a subject of the King of Denmark, and a resident of the city of Copenhagen, in the Kingdom of Denmark, have invented certain new and useful Improvements in Automatic Belt-Shifting Devices; and I do hereby declare that the following is a full, clear, and exact description of the invention, which will enable others skilled in the art to which it appertains to make and use the same, reference being had to the accompanying drawings, which form a part of this specification, and in which—

Figure 1 is a front view of my improved apparatus for automatically shifting belts upon pulleys. Fig. 2 is an end view of the same, and Fig. 3 is a longitudinal vertical sectional view taken on the line *x x* of Fig. 1.

Similar numerals of reference indicate corresponding parts in all the figures.

My invention has relation to devices for automatically shifting a belt from a fast pulley to a loose pulley when the speed of a revolving shaft exceeds the desired speed; and it consists in the improved construction and combination of parts of such a device, which is especially intended for centrifugal creamers and other centrifugal machines, in which accidents are liable to happen if the machines are revolved at too great a speed, although it may be used for any other machinery having revolving shafts, and in which the belt will be shifted automatically from the fast pulley to a loose pulley when the desired speed is exceeded, as hereinafter more fully described and claimed.

In the accompanying drawings, the numeral 1 indicates the shaft, which is journaled in bearings 2, and is provided with a drive-pulley, 3, over which the belt from the motive power passes, and with a fast pulley, 4, and a loose pulley, 5, of the same diameter, and placed upon the shaft one at the side of the other.

Two arms, 6, having weighted outer ends, 7, are pivoted between perforated lips 8, projecting at diametrically-opposite sides of the outer end of the shaft, and the inner ends of these weighted arms are bent inward, as shown at 9, projecting through slots 10 in the shaft, and bear against the inner end of a rod or bar, 11, sliding in an axial bore in the shaft and projecting at the end of the shaft. The upwardly-projecting arm 13 of a bell-crank, 14, bears against the end of this bar, and the bell-crank is pivoted upon a bolt, 15, and has a weight, 16, upon its horizontal arm, and a curved rod, 17, projects from this weight, and has a gong, 18, secured upon its end, which gong may be brought in contact with a projection, 19, upon the shaft when the weight is raised.

A curved arm, 20, projects laterally from the weight, and has its outer end projecting under a pawl, 21, which is pivoted upon a bolt, 22, upon one of the bearings or supports for the shaft, and engaging with its outer end a ratchet-toothed segment, 23, upon the upper end of the upwardly-projecting arm of a bell-crank, 24, having a weighted horizontal arm, 25.

A rod, 26, slides in horizontal bearings 27, and has its outer end pivoted to the upper end of the arm having the segment upon a bolt, 28, extended into a handle, 29, and the inner end of this sliding rod is provided with two fingers, 30, between which the belt runs, and which serve to shift the belt.

It will now be seen that when the sliding rod having the shifting-fingers is drawn out so as to bring the belt to run upon the fast pulley, the pawl will engage the ratchet-teeth of the segment and hold the rod from sliding; but when the speed of the shaft in rotating becomes greater than the desired speed the weighted regulator-arms will strike out sufficiently far by the centrifugal force to force the sliding rod within the shaft against the arm of the bell-crank, raising the weight, which will cause the gong to come in contact with the projection upon the shaft and to be sounded, while at the same time the curved arm will raise the pawl out of engagement with the ratchet-segment, allowing the lower weighted arm of the bell-crank to drop and the upper arm of the same to be tilted inward, sliding the shifting-bar inward, shifting the belt from the fast to the loose pulley. The machine which is driven by the belt will thus have time to lose some of the excessive speed, and the person in charge of the device will be warned by the gong, so that he may bring the shifting-bar and its fingers back together with the belt as soon as the speed has sufficiently decreased to allow the weighted arms to return to their normal position and the weight upon the bell-crank arm to sink sufficiently to allow the pawl to engage the ratchet-segment.

It will be seen that by sliding the shifting-rod and by adjusting it by means of the pawl and ratchet-segment the belt may be brought to rest partly upon the fast and partly upon the loose pulley, so that the belt will be allowed to slip sufficiently upon the fast pulley to admit of the machine to be driven to be run with less speed, while the motive power retains its speed.

Having thus described my invention, I claim and desire to secure by Letters Patent of the United States—

1. In an automatic belt-shifting device, the combination of a shaft having a fast and a loose pulley, a bell-crank having a weighted horizontal arm and a ratchet-segment upon the end of its upper arm, a rod sliding parallel to the shaft and having belt-shifting fingers, and having one end pivoted to the upper arm of the bell-crank, a pawl engaging the ratchet-segment, and a regulator upon the shaft having means for raising the pawl when its arms are thrown out by the centrifugal force, as and for the purpose shown and set forth.

2. In an automatic belt-shifting device, the combination of a shaft having a drive-pulley and a loose and a fast pulley, and formed with an axial recess in its outer end, having slots in the inner end, weighted arms pivoted upon lips upon the shaft and having their inner arms projecting through the slots in the shaft, a rod sliding within the recess of the shaft, projecting beyond the end of the same and bearing against the arms of the weighted arms, a bell-crank having the upper end of its vertical arm bearing against the end of the sliding bar, and having a weight upon its horizontal arm provided with a laterally-projecting curved arm, and with an inwardly-projecting rod provided with a gong engaging projections upon the shaft when raised, a bell-crank having a ratchet-segment upon the upper end of its vertical arm, and having a weighted horizontal arm, a pawl engaging the ratchet-segment and resting upon the curved laterally-projecting arm, and a horizontally-sliding arm having belt-shifting fingers upon its inner end, and having its outer end pivoted to the upper end of the vertical arm of the bell-crank having the ratchet-segment, as and for the purpose shown and set forth.

In testimony that I claim the foregoing as my own I have hereunto affixed my signature in presence of two witnesses.

SVEN JÖNSSON.

Witnesses:
VIGGO C. EHERTT,
E. KNUDSEN.